Sept. 19, 1961  P. R. HOLLAENDER  3,000,656
PIPE OR TUBING CONNECTOR
Filed Sept. 29, 1958  2 Sheets-Sheet 1

INVENTOR.
Peter R. Hollaender,
BY
Wood, Herron & Evans,
ATTORNEYS.

Sept. 19, 1961 P. R. HOLLAENDER 3,000,656
PIPE OR TUBING CONNECTOR
Filed Sept. 29, 1958 2 Sheets-Sheet 2

INVENTOR.
Peter R. Hollaender,
BY
Wood, Herron & Evans.
ATTORNEYS.

United States Patent Office 3,000,656
Patented Sept. 19, 1961

3,000,656
PIPE OR TUBING CONNECTOR
Peter R. Hollaender, Cincinnati, Ohio, assignor to The Hollaender Manufacturing Company, Cincinnati, Ohio, a corporation of Ohio
Filed Sept. 29, 1958, Ser. No. 764,081
5 Claims. (Cl. 287—2)

The subject matter of this invention relates to means for connecting lengths of hollow round pipe or tubing. More particularly, it relates to connective means which are internally expansible.

Structures fabricated of pipe and tubing are in everyday use for a wide variety of purposes. As common instances, they are used as guard railings or fences. They are also used as racks to provide storage space for a great many commercial items. Such structures are uniformly characterized by the presence of several lengths of hollow round pipe or tubing aligned in appropriate spatial disposition to each other and integrally connected at their ends by coupling devices. Probably the most widely accepted connective fitting is the familiar cast sleeve, having a threaded bore into which the ends of two lengths of pipe are screwed. These sleeves are available in a number of forms, among them being the straight sleeve, the T, elbow, cross, and others. It will be readily apparent that the use of any connector of the threaded type inherently necessitates the cutting of threads on the pipe. When, as is usually the case, the pipe is of a diameter of approximately one inch or more, a heavy expenditure of labor as well as expensive thread cutting tools are required to cut the threads into the pipe. This substantially increases the cost of fabricating the pipe structure. In addition, since the sleeve fits over the outside of the pipe, it obstructs the otherwise uniform diameter of the piping. This gives the structure a somewhat "swollen" appearance at those places where the pipes are connected. In addition to derogating from the aesthetic value of the structure, the over-size connectors often interfere in the use to which the structure is put. For example, such outside sleeves impede the free removal of stock stored on pipe racks by making it more difficult to slide or roll the stock over the pipe joints.

Piping may be welded together at the joints as an alternative connective means. Obviously both the expense and time consumed in the fabrication of a pipe structure by welding is appreciable, although this method does eliminate the objectionable joints.

The present invention provides a coupling for lengths of pipe which coupling resides flush with the outside surface of the piping and which may be attached to the piping very quickly without welding or threading or the use of special tools. It makes a much neater, smoother and more finished appearing installation and the completed structure presents no outside sleeves or obstructions.

In substance, this invention is a fitting disposed predominantly internally of the piping which it connects, comprised of two cooperating elements, each of a roughly semi-circular cross section and each having two or more outwardly extended arms configurated with longitudinal ribs. The arms are inserted into the hollow core of the pipe and the two elements are separated from one another by tightening screws residing in one element so as to bring the screws to bear against the other element forcing the ribbed arms into close engagement with the inside surface of the piping, holding the pipe frictionally.

Further description of the invention is best undertaken with reference to the accompanying drawings, in which.

Figure 1:
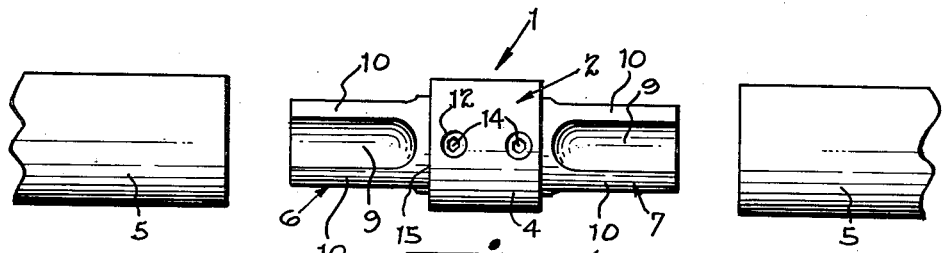
FIGURE 1 is an exploded view showing a straight connector and the ends of two pipes or tubes to be joined by the connector.
Figure 2:
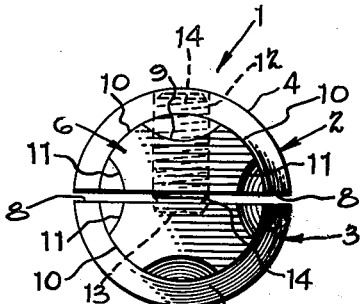
FIGURE 2 is an end view of the straight connector.

In FIGURES 1 through 4, a straight connector is indicated generally at 1. It is comprised of two similar, cooperating split elements designated 2 and 3. Each element has a centrally located collar 4, semi-circular in cross section, of radius approximately equal to the radius of the outside surface of the particular piping 5 with which it is to be used. Extending longitudinally on either side of and axially concentric with the collar 4 are two telescoping arms 6 and 7. Each arm is of semi-circular transverse cross section, the radius of the arms being slightly less than the radius of the interior wall of the piping. The flat bases of both arms and the collar are coplanar with one another and constitute an interface 8 which mates in facial contact with the corresponding interface presented by the other split element. The arms 6 and 7 are configurated with longitudinal flutes 9, the flutes terminating centrally just short of the collar 4, and running out on the outer end of each arm. The relatively raised regions between adjacent flutes constitute pressure ribs or lands 10, which when the connector is interfitted with the pipe, are caused to bear against the internal surface of the pipe, frictionally holding the pipe against both rotational or axial movement relative to the coupling. As may best be seen in FIGURE 2, the preferred arrangement of the fluting is such as to present two pressure ribes 10—10 on each arm, there thus being one full width flute 9 located between the two ribs and two half-width flutes 11, each located between the ribs 10 and the edge of the interface 8. The function of the fluting is to restrict that surface area of the arm which comes into contact with the pipe, thereby increasing the pressure load per unit area of contact, so that the arm may better grip the pipe frictionally. The lands also center the connector in the pipe and evenly distribute the pressure exerted on the pipe to minimize its deformation or splitting.

The collar 4 of one split element 2 is drilled through radially perpendicular to the interface 8, and tapped as at 12 to receive an expanding screw; it is preferred that the collar be drilled to receive two screws 14—14, the screws being spaced longitudinally from one another and each meeting the interface at a right angle. However, a single screw is almost as effective as two and permits the use of a narrower collar. At points immediately opposite the emergence of the screw holes 12 of this split element the interface of the other (mating) split element 3 may be slightly recessed as indicated at 13 to receive the ends of the screws 14 which, in use, come to bear against the recesses thus formed.

Figure 3:
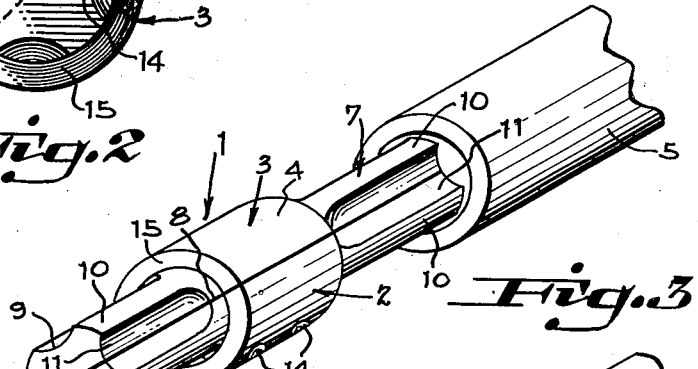
FIGURE 3 is an exploded view in perspective of a straight connector, showing the manner in which it frictionally couples tubing.
Figure 4:
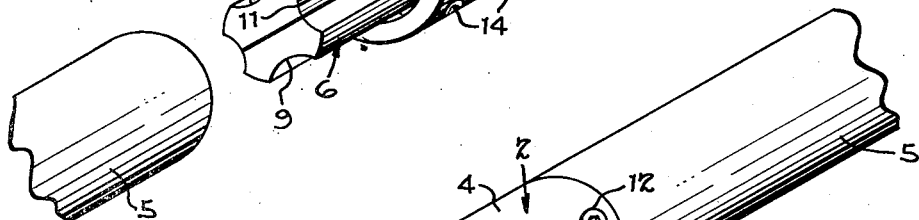
FIGURE 4 is a view similar to FIGURE 3 showing the finished appearance of two pipes joined with a straight connector.

The fitting interconnects two axially colinear pipes or tubes in the following manner, which is as illustrated in FIGURE 3: The two split elements 2 and 3 are placed in facial contact with one another, that is, are mated so that their respective interfaces 8 are in juxtaposition. In this position the collars 4, each being semi-circular in cross section, form a cylindrical whole. Analogously, the arms 6 and 7 also form elongated fluted cylinders. One pair of mated arms is telescoped into the bore of one pipe, being inserted until the annular ring of the end of the pipe abuts the annular ring 15 presented by the flat face at which the collar meets the arm. In like fashion, the other pipe which is to be connected is slipped over the remaining pair of arms until it bears against the opposite face of the collar. Next the expanding screws 14 in the collar are tightened, that is, screwed into the collar. The inner ends of the screws come to press perpendicularly against the internal bore 13 formed in the interface 8 of the opposed split element 3, forcing the two elements 2 and 3 relatively apart from one another. Since the arms of the elements are confined by the inside wall of the pipe, as the screws are tightened further the pressure ribs 10 on each of the four arms contact the inside of the pipe under proportionately increasing force, gripping the pipes and holding them immobile. The resulting connection is shown in FIGURE 4. The collars 4, being of radii equal to that of the outside surface of the pipe form a whole which is flush or coextensive with that surface, so that no augmentation of diameter of the pipes results. The pipes are spaced apart lengthwise by the widths of the collars. It is preferable to use short expanding screws 14, so that their heads do not protrude externally of the collar. For this purpose Allen or Phillips head screws are preferred.

The coupling provided by this invention is an exceptionally neat fitting, being entirely coextensive with the outside surface of the pipe. There is no sleeve of increased diameter to interrupt the uniformity of the structure. Structures made employing these couplings are more aesthetically appealing as well as being easier to use. For instance, structures have two parallel pipe ways are occasionally used to support large metal drums, the drums being rolled along the ways to a desired location. Obviously a sleeve type connector would impede such free movement; connectors made in accordance with this invention will not. A further advantage in the use of the coupling is the speed and ease with which it enables pipe interconnections to be made. The installation is much quicker than the old method of threading or welding pipe, and requires only a screwdriver or Allen wrench to tighten the expanding screws. Depending on the pitch of the expanding screw and the difference between the radius of the arms and that of the inside wall of the pipe, as little as a quarter turn of the expanding screw may be sufficient to secure a tight grip on the pipe. The connectors themselves are inexpensive to manufacture. Probably the most suitable mode of manufacture is to cast the split elements individually in a metal similar to that of which the piping is made. After casting, the interface surface of each element may receive light grinding to true them so as to present accurate plane surfaces. Further grinding may be advantageous to square the shoulders 15 between the end faces of the collar and the arms, so that the pipe end may tightly abut the collar. The expanding screw holes may then be drilled and tapped.

Because of the fact that the arms of the connector telescope lengthwise into the core of the pipe and bear against it along the pressure ribs, the connector tends to align the two pipes with one another. If, under certain circumstances, a bending torque should impinge upon the two coupled pipes, the lands 10 on the arms take up the load over the entire end region of the pipe. Thereby the danger that the pipe might split at the end under the bending strain is materially reduced.

Figure 5:
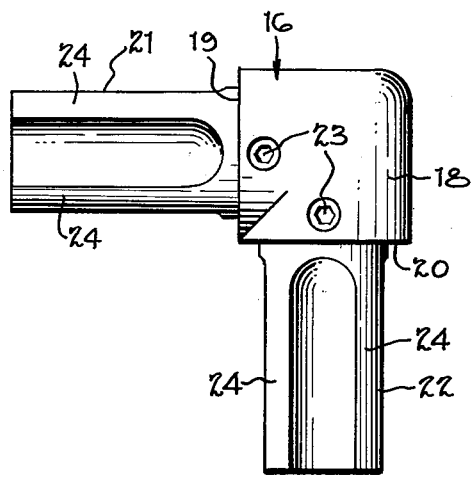
FIGURE 5 is a side view of an elbow connector embodying the principles of this invention.
Figure 6:
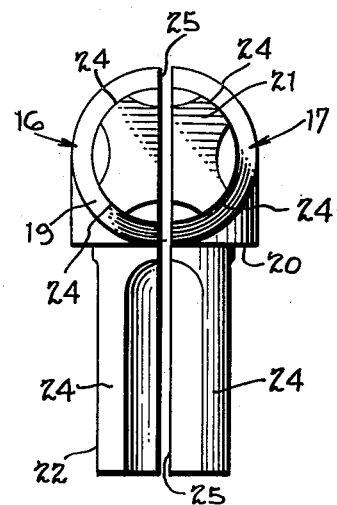
FIGURE 6 is an end view of the elbow connector.

The essence of this invention is thus an internally expansible connector for pipe, having a central collar wherein is contained means for expanding the connector and having a surface coextensive with that of the pipe which it joins. As such, the invention is not limited merely to connectors for axially coextensive lengths of pipe. For example, in FIGURES 5 and 6 is illustrated an elbow-type connector made according to the invention for joining two pipes running at right angles to each other. As is the straight connector previously described, so is the elbow connection also comprised of two similar split elements which are designated as 16 and 17 in the drawings. Disposed centrally of each element is an elbow collar 18 presenting two faces 19 and 20 the planes of which are right angular to one another. Extending longitudinally beyond each collar face are telescoping arms 21 and 22 of semi-circular transverse cross section. It will be seen that the elbow connector is exactly similar to the straight connector previously described, excepting only that the collar faces 19 and 20 are angulated with respect to each other rather than being parallel as in the straight connector. Two expanding screws 23 force apart the split elements 16 and 17, the arms 21 and 22 having been inserted with the pipes (not shown), so that pressure ribs 24 formed on the arms frictionally engage the inner pipe walls. In the embodiment of the elbow as pictured, the mating interface 25 is a single plane surface, perpendicular to the axis of the curve of the elbow. Those skilled in the art will understand that it is equally possible to "split" the connector so that the interface is formed of two right angularly disposed surfaces both of which are parallel to the axis of the "bend" in the collar. In such an embodiment, the two expanding screws press the mating halves diagonally apart. Because of its substantial similarity to that shown in FIGURES 5 and 6, this alternative configuration is not shown.

Figure 7:
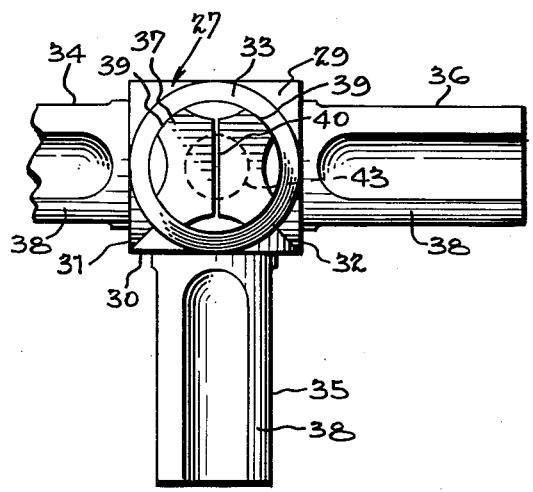
FIGURE 7 is a side view of a side outlet T connector made according to the invention.
Figure 8:
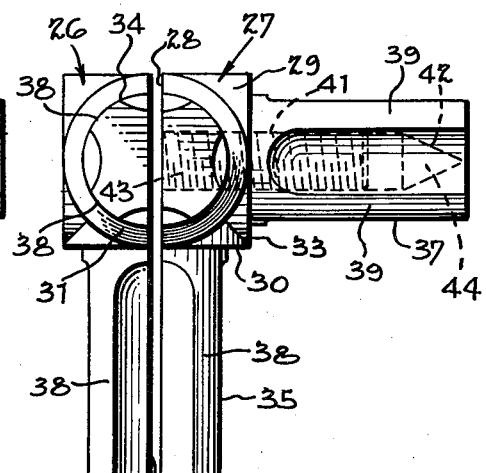
FIGURE 8 is an end view of the side outlet T.

In FIGURES 7 and 8 a side outlet T fitting is shown embodying the principle of this invention. This fitting is adapted for connecting four pipes, meeting at three right angles to each other. The two split elements, designated 26 and 27, are basically like those previously described, the "split" or interface 28 being contained entirely in a single plane. The central collar 29 of the outlet element 27 has four faces, 30, 31, 32 and 33. From faces 30, 31 and 32, all of which are adjacent the interface 28, three semi-circular arms 34, 35 and 36 extend, each of which is configurated with fluting so as to provide pressure ribs 38 similar to those previously described.

From that face 33 which is parallel to the interface 28, an outlet arm 37 of circular rather than semi-circular section extends. This arm is fluted completely about its outer extremity forming pressure ribs 39. An axial slot 40 extends inwardly from its outer end, partially splitting the outlet arm 37 down its length. An axial bore 41 is drilled from the interface 28 terminating in a tapered end 42 inwardly of the outer end of the outlet arm. This bore is tapped to receive an expanding screw 43, whereby the split outer ends of the arm 37 may be forced apart by turning the screw 43 so that the screw moves toward the end of the arm 37, into the tapered end 43 of the bore in which it resides. The screw impinges on a tapered block 44 residing in the bore, moving the block so that it in turn bears against the tapered wall of the bore causing the split ends of the arm to frictionally engage the walls of the pipe, holding that pipe in a position abutting the face 33 of the collar 29. Once the outlet pipe thus has been connected to the outlet half 27 of the fitting, the mating element 26 is then placed in interfacial contact with it and the remaining three pipes, those which form the T, are slipped over the arms 34, 35 and 36. Expanding screws (not shown) on the element 26, opposed to the outlet element 27 are then screwed in, expanding the connector and holding the pipes forming the T.

With the application of ordinary mechanical skill, the invention may be adapted to provide a wide variety of other fittings. A side outlet elbow is readily conceived as is a four-way cross over, to mention only two of the types of connectors in which it may be employed. Because of their basic similarity, these other designs are not illustrated herein.

Having described my invention, I claim:

1. A connector for joining lengths of hollow piping comprising, a central collar of diameter equal to the outside diameter of the piping, generally cylindrical arms extending from the ends of said collar of diameter equal to the inside diameter of the piping, said arms being configurated to provide evenly spaced concave flutes extending from the outer ends of the arms toward said collar, said flutes terminating short of the ends of said collar, a longitudinal split dividing said connector into two halves, the collar of one half containing at least one expanding screw disposed at right angles to the plane of said split, whereby the two halves of said connector may be forced apart from one another by said screw when said arms are inserted telescopingly into said piping, and the relatively raised portions of said arms between fluten comprising lands to center said arms in said piping and to evenly distribute the pressure exerted by said arms in said piping.

2. The connector of claim 1 wherein said split bisects a pair of said flutes.

3. The connector of claim 1 wherein there are four flutes in each arm, defining four lands between them.

4. A connector for joining two lengths of hollow piping the axes of which are coincidental, said connector comprising, a right cylindrical central collar of diameter equal to the outside diameter of the piping, a generally cylindrical arm extending perpendicularly from each end face of said collar of diameter equal to the inside diameter of the piping, each arm being configurated to provide evenly spaced concave flutes extending from its outer end toward said collar, said flutes terminating short of the adjacent end faces of said collar, a longitudinal split dividing said connector into two halves, the collar portion of one half containing at least one expanding screw disposed at right angles to the plane of said split whereby the two halves of said connector may be forced apart from one another by said screw when said arms are inserted telescopingly into said piping, and the relatively raised portions of said arms between said flutes comprising lands to center said arms in said piping and to evenly distribute the pressure exerted by said arms in said piping.

5. A connector for joining a plurality of lengths of hollow piping extending angularly with respect to each other, said connector comprising, a central collar having end faces of diameter equal to the outside diameter of the piping, said end faces being angulated with respect to each other, a generally cylindrical arm extending perpendicularly from each end face of diameter equal to the inside diameter of each piping, the angulation of said arms corresponding to the angulation of said lengths of piping, each arm being configurated to provide evenly spaced concave flutes extending from its outer end toward said collar, said flutes terminating short of the adjacent end face of said collar, a longitudinal split dividing said connector into two halves, the collar of one half containing at least one expanding screw disposed at right angles to the plane of said split whereby the two halves of said connector may be forced apart from one another by said screw when said arms are inserted telescopingly into said piping, and the relatively raised portions of said arms between flutes comprising lands to center said arms in said piping and to evenly distribute the pressure exerted by said arms in said piping.

References Cited in the file of this patent

UNITED STATES PATENTS

| | | |
|---|---|---|
| 1,787,017 | Paul | Dec. 30, 1930 |
| 2,657,944 | Miller | Nov. 3, 1953 |
| 2,817,547 | Canepa | Dec. 24, 1957 |

FOREIGN PATENTS

| | | |
|---|---|---|
| 680,049 | Great Britain | Oct. 1, 1952 |
| 90,082 | Sweden | Aug. 24, 1937 |
| 1,061,428 | France | Apr. 12, 1954 |